United States Patent [19]
Beeler et al.

[11] Patent Number: 5,344,173
[45] Date of Patent: Sep. 6, 1994

[54] FIFTH WHEEL SLIDE STOP

[76] Inventors: Dwight E. Beeler, Rt. 2, Box 271; Perry S. Bailey, Rt. 2, Box 272, both of Washburn, Tenn. 37888; Joseph Z. Bailey, 150 Barber Rd., Corryton, Tenn. 37721

[21] Appl. No.: 158,961
[22] Filed: Nov. 29, 1993
[51] Int. Cl.⁵ .............................. B62D 53/08
[52] U.S. Cl. .................................. 280/438.1
[58] Field of Search .......... 280/407, 407.1, 432, 280/433, 438.1, 441, 441.2

[56] References Cited

U.S. PATENT DOCUMENTS

| | | | |
|---|---|---|---|
| 2,985,463 | 5/1961 | Geerds | 280/407 |
| 3,191,966 | 6/1965 | Felburn | 280/407 |
| 3,606,384 | 9/1971 | Fontaine et al. | 280/407 |
| 4,429,892 | 2/1984 | Frampton et al. | 280/407 |
| 4,443,025 | 4/1984 | Martin et al. | 280/438.1 X |
| 4,614,355 | 9/1986 | Koch | 280/407 X |
| 5,265,900 | 11/1993 | Stack, Jr. et al. | 280/438.1 |

Primary Examiner—Brian L. Johnson
Assistant Examiner—Victor E. Johnson
Attorney, Agent, or Firm—Luedeka, Neely & Graham

[57] ABSTRACT

The final position of a slideable fifth wheel hitch assembly which permits the relative positions of a tractor and its associated trailer to be adjusted is precisely controlled by a small slide stop tool which engages the rack teeth on a fifth wheel carrier slide assembly guide rail pair. The slide stop is meshed in the gap between rack teeth to provide a quickly and conveniently positioned abutment on the guide rails at the precise location desired for the fifth wheel carrier assembly sled runners.

8 Claims, 3 Drawing Sheets

FIFTH WHEEL SLIDE STOP

BACKGROUND OF THE INVENTION

This invention relates generally to fifth wheel assemblies for coupling semi-trailers to tractors. More particularly the invention relates to a method and apparatus for assisting the precise positionment of an adjustable fifth wheel carrier assembly.

Large highway freight trailers are usually coupled to an associated tractor by means of a fifth wheel assembly whereby the tractor rear drive axles directly support a portion of the trailer load burden. Usually, the fifth wheel couple and support point is located along the length of the tractor between the rear drive wheels and the front steering wheels thereby distributing the front trailer burden between the driver and the steering wheels. The exact percentage of load desirably placed upon the front steering wheels is a variable dependent upon many factors including the road surface, the tractor equipment, the weather, the weight of the trailer and the whim of the driver.

Some degree of control over these variables is provided by a fifth wheel receiver that is mounted on a slide carriage assembly. The carriage assembly is rail guided and includes an anchoring mechanism for securing the slidable assembly at the desired point along the tractor length between the driving and steering wheel axles.

Finding and setting the fifth wheel carriage assembly at the desired point can be tedious, time consuming, and frustrating. The general procedure is to lock the trailer brakes, release the fifth wheel carriage anchor mechanism, and then drive the tractor forward or reverse until the fifth wheel carriage is at the desired point whereupon the anchoring mechanism is reengaged to secure the fifth wheel carriage at the desired location. When the trailer is heavily loaded, stopping the tractor at the exact location desired for the fifth wheel assembly can be difficult.

It is an object of the present invention, therefore, to teach a method for precisely controlling the terminal point of a position changeable fifth wheel carriage.

Another object of the present invention is to provide a small, conveniently carried, tool adapted for convenient positionment on a fifth wheel carriage slide rail rack as a selectively positionable abutment structure.

Another object of the present invention is to provide a position adjustable fifth wheel carriage assembly having convenient and rapid redistribution of trailer weight on the drive and steering axles of the tractor.

A still further object of the present invention is to provide a method and apparatus for adjusting the position of a fifth wheel slide carriage in one single, positively controlled movement of the tractor.

SUMMARY OF THE INVENTION

Most fifth wheel slide carriage units are guided along a pair of parallel rails having a cogged or hobbed upper edge in the form of a gear rack with a plurality of periodically spaced teeth separated by gaps.

Each tooth period in the rail rack provides an anchor position for the fifth wheel carriage slide assembly. An anchor mechanism secured to the slide carriage unit meshes with the rail rack at the position desired for the fifth wheel carriage assembly.

When a fifth wheel carriage position change is required, slide stop tools of the present invention are positioned on the rail rack in mesh with the teeth to provide a physical abutment structure for engagement by a leading edge of the fifth wheel slide carriage at the desired terminal point. With the trailer coupling pin secured in the fifth wheel receiver socket, the trailer wheel brakes are set. The fifth wheel carriage slide anchor is now released to free the carriage for sliding movement relative to the guide rails. By means of the tractor power unit and drive wheels, the tractor frame mounted rails are moved under the fifth wheel carriage slide assembly until the slide stop tool engages the leading edge of the fifth wheel carriage unit. At this point the fifth wheel carriage anchoring structure is reengaged with the guide rail to complete the fifth wheel position change procedure.

BRIEF DESCRIPTION OF THE DRAWINGS

Relative to the drawings wherein like reference characters throughout the several figures of the drawings designate like or similar structures and elements.

DESCRIPTION OF THE PREFERRED EMBODIMENT

Figure 1:
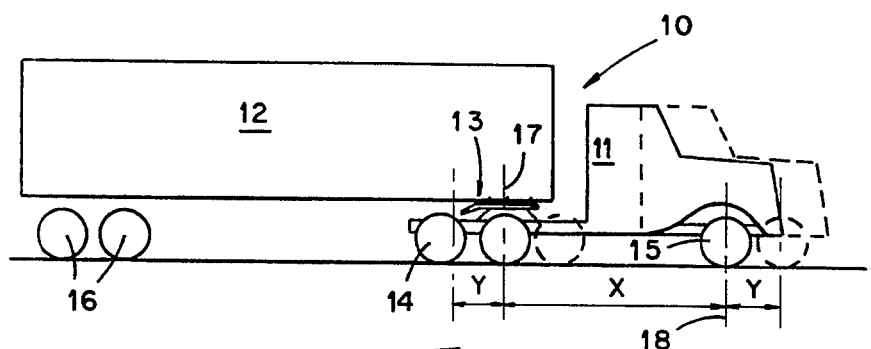
FIG. 1 represents a tractor-trailer assembly equipped with a position adjustable fifth wheel trailer hitch.

Relative to FIG. 1, a highway tractor-trailer unit 10 is shown to include a powered tractor 11 and a trailer 12 connected by a fifth wheel hitch assembly 13 for relative articulation about a vertical axis. Propulsive power of the tractor unit 11 is delivered to driving wheels 14. Tractor directional steering is controlled by front wheels 15. Trailer secured wheels 16 carry the aft end of the trailer load and are served by a braking mechanism that may be engaged independently of the tractor wheel brakes.

To illustrate the objective of a position adjustable fifth wheel unit 13 the value X is shown as the distance between the fifth wheel vertical hitch axis 17 and the tractor steered wheel plane 18. If the fifth wheel hitch axis 17 is shifted to the aft of the tractor by a distance Y the percentage of trailer load carried by the tractor steering wheels is correspondingly reduced and the load carried by the tractor driving wheels 14 is increased.

Figure 2:
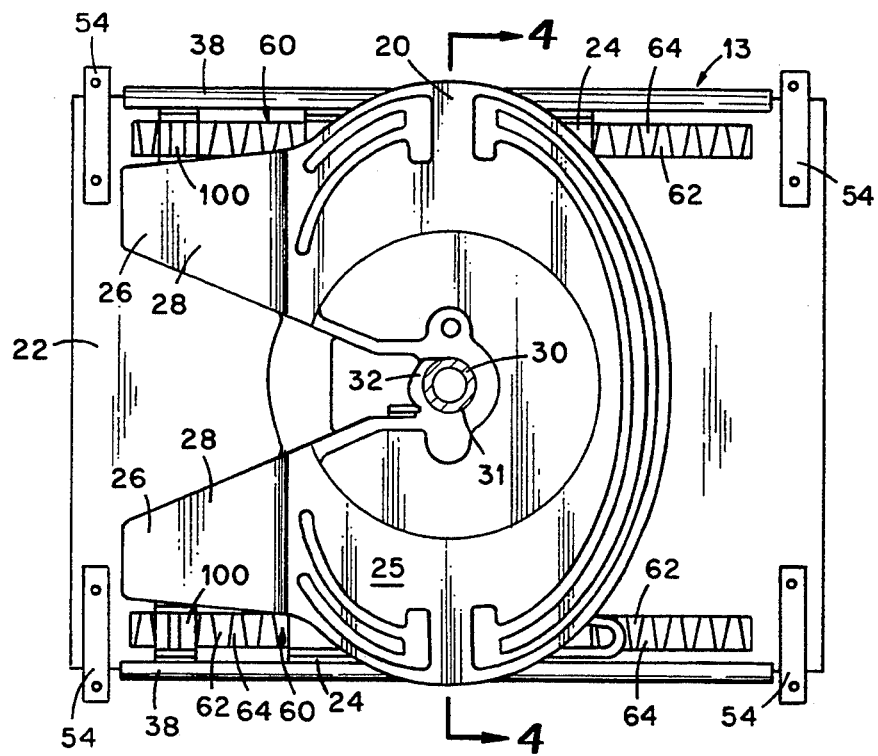
FIG. 2 is a plan view of a position adjustable fifth wheel trailer hitch according to the present invention.
Figure 3:
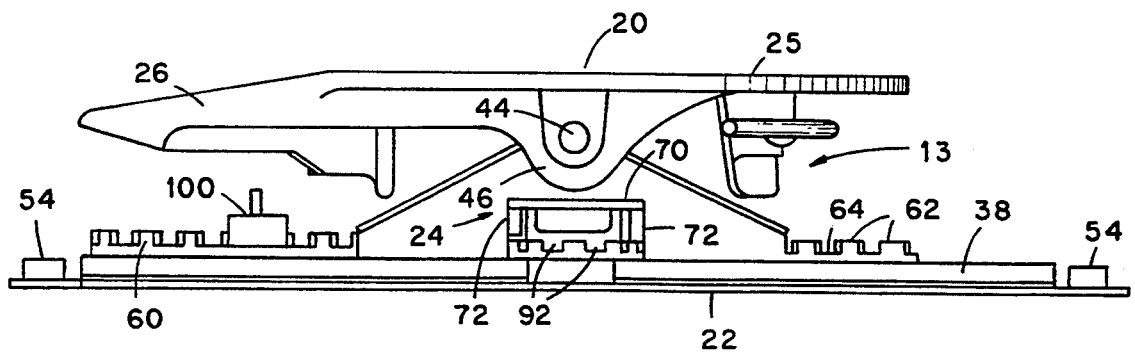
FIG. 3 is a side elevation of a fifth wheel trailer hitch assembly according to the present invention.

Such an adjustable position fifth wheel assembly 13 is shown in FIGS. 2 and 3 to include a fifth wheel carrier assembly 20 mounted on a base plate 22. The carrier assembly includes a pair of sled runners 24 having outside and inside runner flanges 34 and 36, respectively. A guide slot for each of the sled runners 24 is formed between the edges of an internal guide plate 50 and opposite base plate edge channels 38.

Each sled runner 24 supports a trunion journal bearing 42 within a journal sleeve 40. The fifth wheel receiver plate 25 is pivotally secured to the sled runners 24 by journal pins 44 through outside and inside pin bosses, 46 and 48, respectively.

As a unit, the fifth wheel coupling 13 is secured to the tractor 11 frame rail by means of anchor brackets 54.

The fifth wheel receiver plate 25 comprises a large load bearing area and a pair of fork tines 26 for structurally defining guide slot edges 28. During the tractor-trailer hitching process these guide slot edges 28 funnel the trailer secured coupling pin 30 to the receiver plate center where it is secured in a pin socket 31 by the pin locking mechanism 32.

Also secured to the base plate 22 along and within each of the sled runner channels are respective rack rails 60. The upper surface face of these rack rails is hobbed or cogged with rack teeth 62 separated at periodic spacings by gaps 64.

Figure 4:
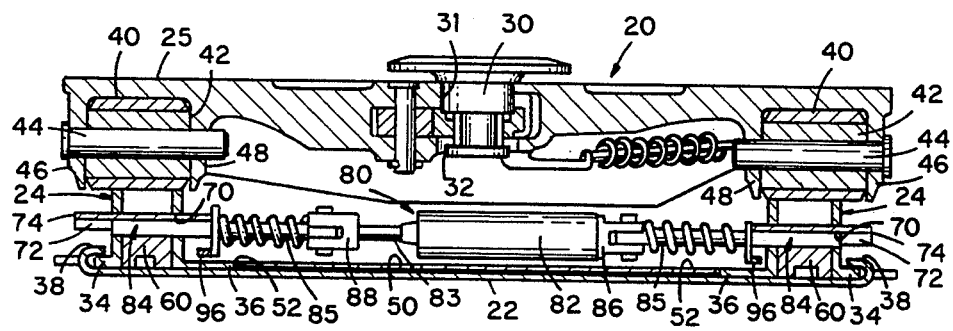
FIG. 4 is a sectioned elevational view of the invention along the cutting plane 4—4 of FIG. 2.
Figure 5:
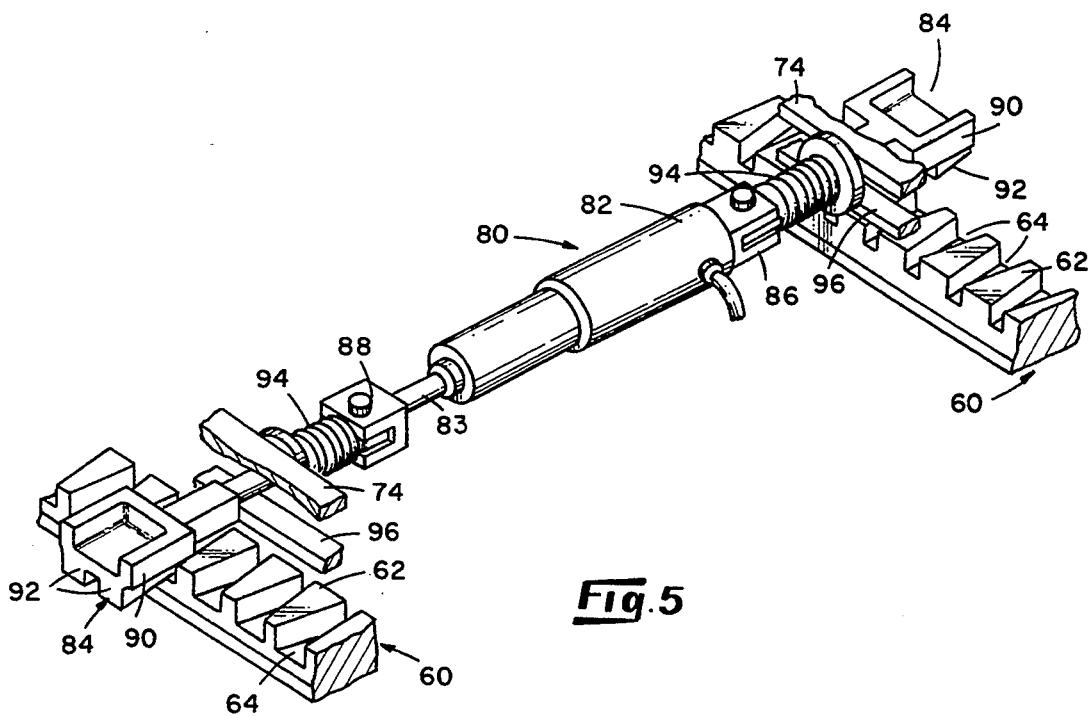
FIG. 5 is an isolated perspective of a carriage slide anchoring mechanism.

Relative to FIGS. 4 and 5, a carrier assembly anchor mechanism 80 is disposed between the sled runners 24 and includes a remotely operated power cylinder 82 and piston rod 83. Locking shoes 84 are secured by respective shanks 85 to the rod and cylinder by yoke couplings 88 and 86, respectively.

The locking shoes 84 each include a head portion 90 and a pair of rack teeth 92. The rail and locking shoe rack teeth 62 and 92, respectively, are of wedge or dove-tailed planform for reasons to be subsequently apparent. Coiled compression springs 94 are disposed around the locking shoe shanks 85 between respective yoke couplings 86 and 88 and the spring seat 96. Spring seats 96 are structurally integral elements of sled runners 24 below locking shoe operating portals 70 through the sled runner web structure. These operating portals 70 are lined by side bearing walls 72 and top bearing walls 74.

The bias of locking shoe springs 94 is to telescopically collapse the piston rod 83 into the cylinder 82 and draw the locking shoe teeth 92 into respective gaps 64 between flanking racked rail teeth 62.

The power cylinder and rod combination is not secured to any other structure but adjustably floats between the bias of springs 94. Actuation of the power cylinder as by pressurized fluid for example, telescopically expands the rod 83 axially from the cylinder 82 against the bias of the shoe springs 94 to displace the locking shoe teeth 92 from respective rail gaps 64 thereby releasing the sled runners 24 for sliding displacement along the rail 60.

When an operator desires to change the relative position of the fifth wheel carrier assembly 20 along the tractor 11 axis, he either blocks the trailer wheels 16 or sets the brakes associated with wheels 16 and activates the anchor shoe teeth 96 from the rack gaps 64. The fifth wheel carrier assembly 20 is now free to slide along the rails 60 which are secured to the tractor unit 11. Control over such sliding movement is regulated by the application of engine power to the tractor drive wheels 14. Resultantly, the tractor unit 11 must be positioned within 0.125 to 0.25 inch of a final objective position relative to the trailor. When the fifth wheel base plate 22 is sliding under an 8 to 10,000 pound load carried by the fifth wheel sled runners 24, it is extremely difficult to position the rack 60 within the narrow tolerance band allowed by the anchor mechanism 80.

Figure 6:
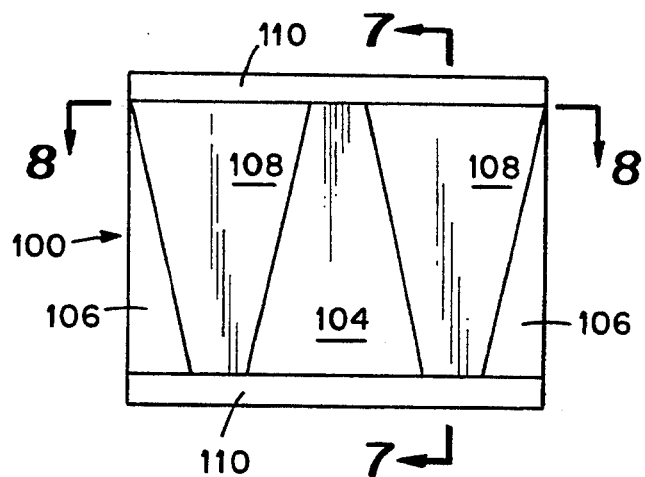
FIG. 6 is a bottom plan view of the present invention slide stop tool.
Figure 7:
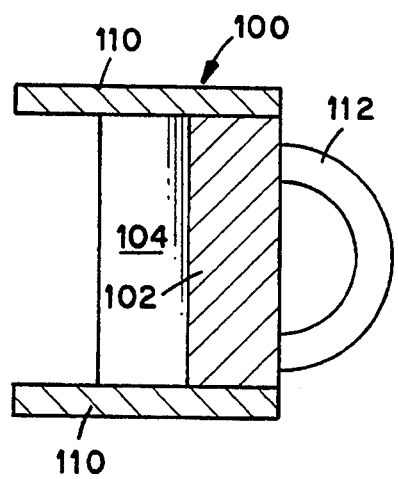
FIG. 7 is a sectioned end elevation of the present invention slide stop tool as viewed along the cutting plane 7—7 of FIG. 6.
Figure 8:
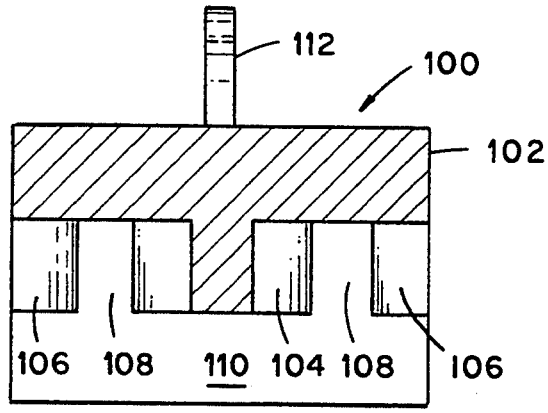
FIG. 8 is a sectioned side elevation of the present invention slide stop tool as viewed along cutting plane 8—8 of FIG. 6.
Figure 9:
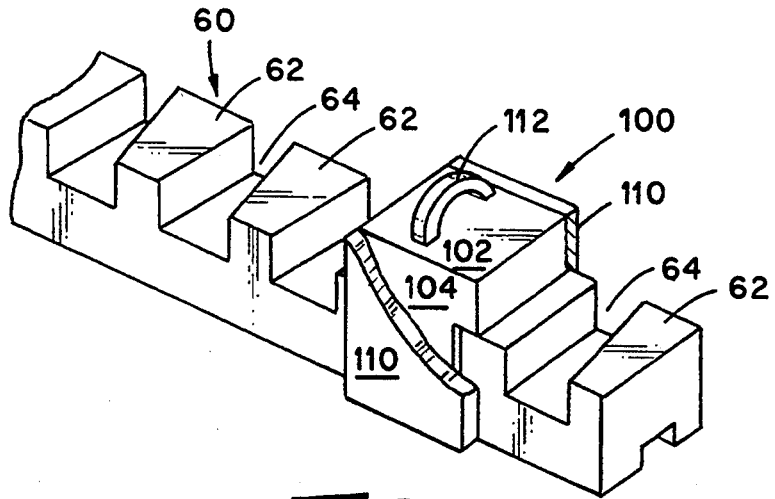
FIG. 9 is an isolated perspective of a fifth wheel carriage rail rack having the present invention slide stop tool meshed therewith.

Responsive to this difficulty, the invention includes the slide stop tool 100 illustrated by FIGS. 6, 7 and 8. Included is an abutment plate 102 from which are projected at least one rack tooth 104 and a pair of half teeth 106. Between the rack teeth 104 and 106 are a pair of tooth gaps 108. Confinement fences 110 secured across the plate 102 end faces of the abutment plate 102 straddle the rack 60 width when a slide stop rack tooth 104 is meshed within a rack gap 64. A bail 112 provides a convenient gripping surface for placement and removal of the slide stop unit.

Using the slide stop 100 to shift a carrier assembly, the stop 100 is meshed within the appropriate rack gap 64 to position the abutment plate end at the point along the rack length where it is desired to terminate the sled runner end. So positioned, the tractor is driven gently toward engagement of the slide stop with the carrier assembly end whereas relative movement between the trailer 12 connected carrier assembly and the tractor 11 secured guide rails 60 is terminated when the proximate end of the sled runners abut the slide stop 100.

Having fully described our invention and its operation, equivalent and alternative designs will occur to those of ordinary skill in the art. As our invention, however,

We claim:

1. A slide stop for fifth wheel trailer coupling means secured to a fifth wheel carrier assembly that is longitudinally guided along a length of rail means, said rail means having a plurality of rack teeth of substantially uniform height and width that are distributed along the length thereof, adjacent rack teeth along said rail means being separated by rack tooth spaces to receive selectively disengaged carrier assembly anchoring means, said slide stop comprising tooth space meshing means depending from abutment means disposed between fences that are separated by the approximate width of said rack teeth, said meshing means, abutment means and fences being a structurally independent, static and substantially integral body that may be freely meshed with sand removed from said rail means in a direction substantially perpendicular to said rail length for securing said slide stop to said rail means at a location corresponding to a desired positional location of said carrier assembly along said rail means and when said carrier assembly anchoring means is disengaged from said rail means, displacement of said carrier assembly along said rail means is terminated by physical abutment of said carrier assembly with said slide stop.

2. A slide stop as described by claim 1 wherein said tooth space meshing means comprises at least one tooth substantially similar to said rail means rack teeth and substantially fills a rack tooth space.

3. A slide stop as described by claim 2 wherein said one tooth respective to said slide stop is confined between lateral fence means whereby said fence means straddles said rail means when said one tooth is meshed with a tooth space.

4. A slide stop as described by claim 2 wherein tooth structure respective to said rack and slide stop comprises a dove-tailed plan geometry.

5. The combination comprising fifth wheel trailer coupling means secured to a support assembly that is positionally restrained to longitudinal movement along a length of rail guide means, said rail guide means having a plurality of rack teeth of substantially uniform height and width that are distributed along the length thereof, adjacent rack teeth along said rail means being separated by rack tooth spaces to receive selectively disengaged support assembly anchoring means and, slide stop means having tooth space meshing means depending from abutment means disposed between fence that are separated by the approximate width of said rack teeth, said meshing means, abutment means and fences being a structurally independent, static and substantially integral body that may be freely meshed with and removed from said rail means in a direction substantially perpendicular to said rail length for securing said slide stop means to said rail means at a selected location for limiting displacement of said support assembly along said rail means in one direction when said assembly anchoring means is disengaged from said rail means.

6. A combination as described by claim 5 wherein said tooth space meshing means comprises at least one tooth substantially similar to said rail means rack teeth and substantially fills a rack tooth space.

7. A combination as described by claim 6 wherein said one tooth respective to said slide stop is confined between lateral fence means whereby said fence means straddles said rail guide means when said one tooth is meshed with a tooth space.

8. A combination as described by claim 6 wherein tooth structure respective to said rack and slide stop comprises a dove-tailed plan geometry.

* * * * *